Oct. 15, 1957     F. E. FOWLER     2,809,597
MOTORLESS CARBONATOR
Filed Feb. 23, 1951     2 Sheets-Sheet 1
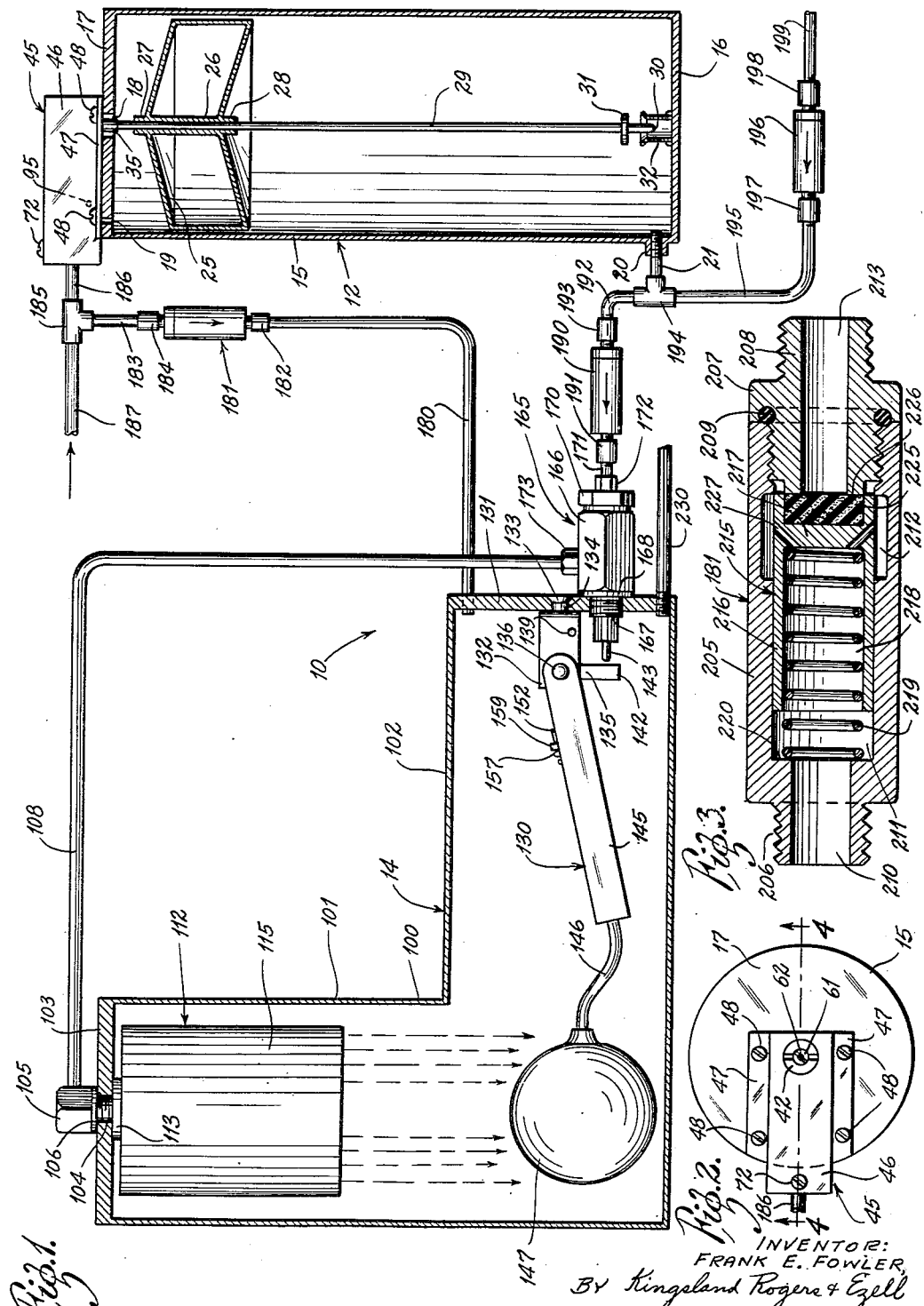
INVENTOR:
FRANK E. FOWLER,
BY Kingsland, Rogers & Ezell
ATTORNEYS Oct. 15, 1957  F. E. FOWLER  2,809,597
MOTORLESS CARBONATOR
Filed Feb. 23, 1951  2 Sheets-Sheet 2
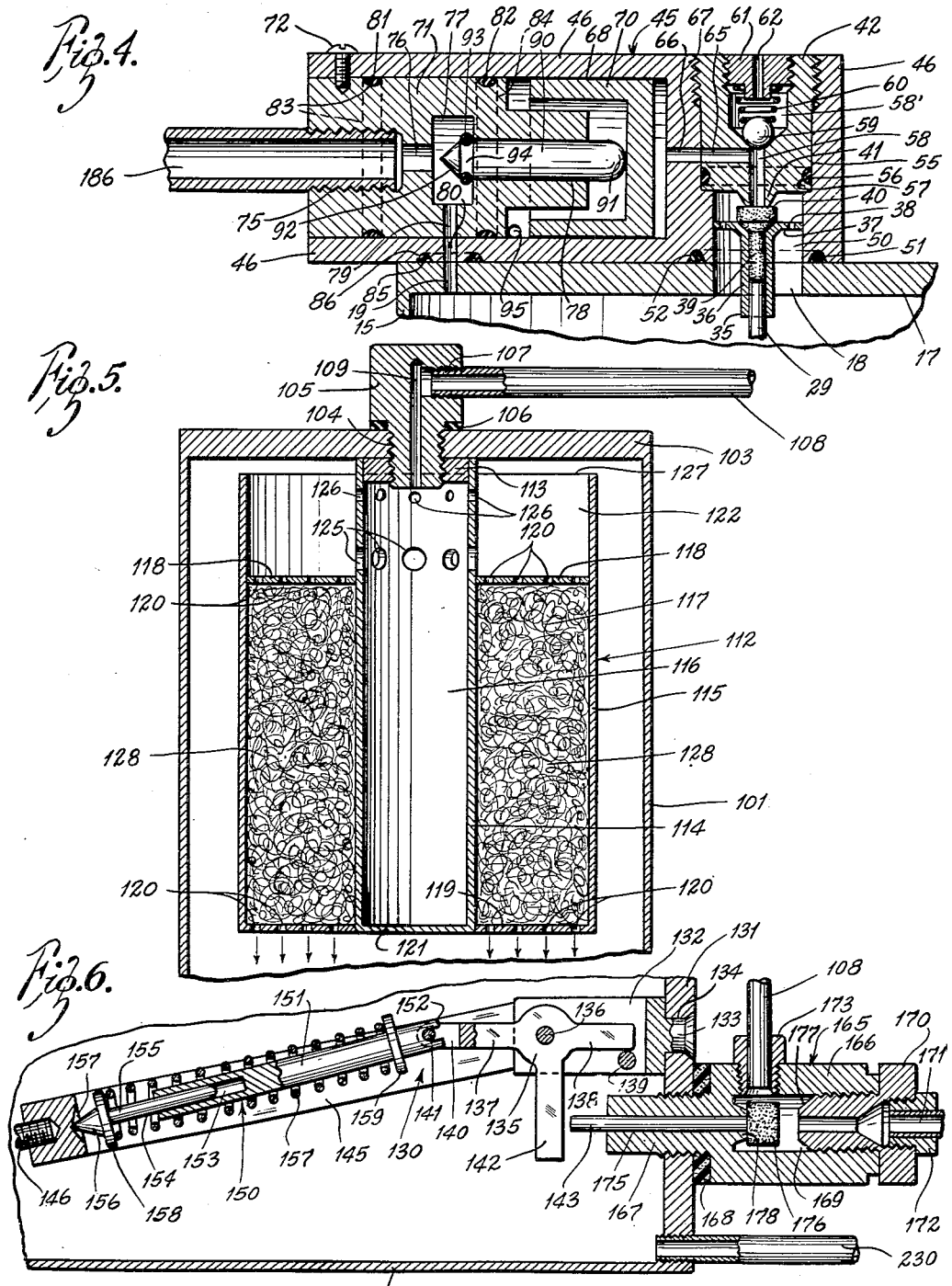

United States Patent Office 2,809,597
Patented Oct. 15, 1957

2,809,597

MOTORLESS CARBONATOR

Frank Edward Fowler, Athens, Ga.

Application February 23, 1951, Serial No. 212,277

6 Claims. (Cl. 103—248)

The present invention relates to carbonators, and more particularly to a motorless carbonator which does not require powered means to introduce water into a mixing chamber containing carbon dioxide gas.

The process of dissolving carbon dioxide gas in water to form carbonated or charged water is well known, and the apparatus in which water is thus impregnated is generally called a carbonator. Conventional carbonators include a mixing tank which is connected to a carbon dioxide supply adapted to maintain a pressurized carbon dioxide atmosphere of from 100 to 150 pounds per square inch in the mixing tank. Water is introduced into this carbon dioxide atmosphere in the form of an atomized spray, absorbs the gas, and collects in the bottom of the mixing tank, whence it may be drawn off at will to make carbonated beverages and the like. Obviously, the more completely water can be broken up into small droplets or agitated so as to cause foam or bubbles, the more readily it will absorb carbon dioxide gas.

In the past, power operated pumps of relatively high pressure capacity have been necessary to introduce the water into the pressurized mixing tank. Additionally, appropriate means to control the starting and stopping of the pump as the mixing tank is filled and emptied have taken the form of float operated switches and relays in electrical circuits. It is, of course, recognized that the use of an electrically powered pumping unit including the necessary controls must inevitably add to the initial cost as well as to the maintenance expense of the carbonating apparatus. Aside from these disadvantages of cost and operating expense, there are numerous places where it is impracticable to stock bottled beverages and where electrical devices are not permitted to be connected to the existing power circuits. For this reason, a great number of potential outlets cannot presently be served with carbonated beverages because electricity is not available to drive the carbonator. For example, it is said that U. S. naval vessels do not allow vending equipment to be connected to the ship's power in time of war. Also, ground troops in battle areas can receive but very limited supplies of carbonated beverages either in the form of bottled products, due to transportation difficulties, or in the form of on-the-spot carbonated products, due to lack of appropriate power supply. It is an object of the present invention, therefore, to provide a motorless carbonator of the type described which does not require a power-consuming pump unit.

Carbonated beverages are generally considered to be most refreshing when consumed at temperatures between 35° and 40° F. Obviously, a simple and practical means for achieving this relatively low temperature in a beverage is to immerse the carbonator itself in cold water or ice. Although such a procedure would be impractical with an electrically driven carbonator, it is an object of the present invention to provide a motorless carbonator of the type described which can be completely immersed in cold water or in an ice bath without affecting its operation.

A carbonator which does not require the use of an outside power source for its operation is obviously adapted for use in many locations where the operation of conventionally powered carbonators has not heretofore been feasible. Thus, the elimination of outside power requirements as contemplated in the present invention provides a device which is inherently portable and, thus, well suited to the purposes of transient groups, such as field expeditions and the like. Thus, it is another object of the invention to provide a motorless carbonator of the type described which is portable and adapted for use in any location.

The motorless carbonator contemplated herein does not avoid the necessity of introducing water into a pressurized mixing tank. However, as will be apparent from a detailed description to follow, appropriate flow of water into the mixing tank may be achieved through utilization of pressure available from a conventional cylinder containing carbon dioxide gas under pressure. It is, therefore, another object of the present invention to teach a method of carbonating water wherein pressure from a carbon dioxide supply cylinder may be utilized for introducing water into a pressurized mixing tank.

Inasmuch as the rate of withdrawal of charged water from the mixing tank is very likely to be variable, it is clearly advantageous to provide a carbonator with automatic controls to insure a constant supply of charged water. As indicated above, such controls for use on electrically powered carbonators are generally tied in with electrical circuits. It is an object of the present invention, however, to provide an automatic control for a motorless carbonator of the type described, which control is adapted to effect a desired control of the operation of the carbonator without the use of electrical circuits.

Additional objects of the invention are to provide a motorless carbonator which is relatively inexpensive to manufacture, which is dependable and positive in its operation, and which will efficiently perform the service for which it is intended.

Still other objects and advantages will be apparent from the following description taken with the accompanying drawings, in which:

Fig. 1 shows a diagrammatic arrangement, partly in section, of a motorless carbonator constructed in accordance with the teachings of the present invention;

Fig. 2 is a top plan view of a pump tank surmounted by a main control valve;

Fig. 3 is a longitudinal sectional elevation of a differential check valve;

Fig. 4 is a fragmentary sectional elevation of the pump tank surmounted by the main control valve, showing the detailed internal construction of the latter;

Fig. 5 is a fragmentary sectional elevation showing an upper portion of a mixing tank and the structure disposed therein; and Fig. 6 is a fragmentary sectional elevation of a lower portion of the mixing tank, showing details of structure disposed therein and mounted thereto.

Referring to the drawings more particularly by reference numerals, 10 indicates generally an apparatus constructed in accordance with the teachings of the present invention, the apparatus being adapted to receive water and carbon dioxide from separate appropriate sources (not shown) and to mix these two fluids at an automatically controlled rate to provide a continuous supply of carbonated water. The apparatus 10 includes a pump tank 12 and a mixing tank 14 which are interconnected by appropriate piping and flow control devices, as will appear.

The pump tank 12 comprises a cylindrical shell 15, preferably constructed of metal and capable of withstanding an internal operating pressure of at least 100 pounds per square inch. The shell 15 includes a bottom closing member 16 and a top closing member 17, the latter having a central aperture 18 of relatively large size and an offset port 19 of relatively small size. At a low point in the side wall of the shell 15 there is provided a threaded connection 20 which receives a pipe 21 adapted both to admit water to and to emit water from the interior of the shell 15. A hollow float member 25 shaped substantially as clearly shown in Fig. 1 of the drawings is disposed internally of the shell 15 and is adapted to move freely upwardly and downwardly as the water level within the shell 15 changes. It will be noted that a centrally disposed sleeve member 26 of the float 25 has upper and lower end extensions 27 and 28, these being for a purpose to appear. The sleeve member 26 receives a valve rod 29 so as to be freely slidable thereupon. The valve rod 29 is mounted for limited upward and downward movement and, as depicted in Fig. 1, is adapted to occupy an upper limit position wherein its lower end 30 is disposed substantially above the bottom closing member 16, and a collar 31, secured near the end 30, is disposed substantially above the upper end of a guide sleeve 32 appropriately secured to and centrally of the bottom 16.

The upper end of the valve rod 29 is received and appropriately secured in a sleeve portion 35 of a valve guide 36 (Figs. 1 and 4). The valve guide 36 includes also a circular flange portion 37 having a plurality of perforations 38. A valve 39, preferably formed of soft rubber or like material and provided with a flat upper surface 40, as clearly shown in Fig. 4, is received in an upper portion of the valve guide 36 so as to be in coaxial extension to the valve rod 29. This valve 39 is appropriately secured in the valve guide 36 so as to move with the valve rod 29, the flat surface 40 being disengageable from a seat portion 41 of a valve plug 42. It will be understood that the valve rod 29, the valve guide 36, the valve 39, and the valve plug 42 are all functional members of a main control valve 45 having additional functional members, as will appear. Thus, the main control valve 45 includes a valve body 46 mounted by means of flanges 47 and screws 48 to the upper surface of the top closing member 17 of the shell 15 (Fig. 2). Thus mounted, a vertical bore 50 of the same diameter as the aperture 18 forms a vertical extension to the latter and receives the valve guide 36. The valve guide 36, which, of course, moves with the valve rod 29 and the valve 39, is thus adapted for free vertical movement within both the bore 50 and the aperture 18. It is to be noted, however, that the circular flange 37 never descends below the closing member 17 and is, therefore, not subject to appreciable lateral movement. A suitable gasket or O-ring 51 may be disposed in a groove 52 formed in the body 46 so as to seal the joint between the aperture 18 and the bore 50, as clearly shown in Fig. 4.

The valve plug 42 is received and threadedly retained in a counterbored extension 55 of the bore 50, this connection being sealed by means of an O-ring 56 disposed in an annular groove 57. As clearly shown in Fig. 4, a vertical port 58 extends concentrically through the lower portion of the valve plug 42 to communicate the seat portion 41 with an enlarged recess 58' which contains a conventional ball check valve 59 appropriately biased by means of a spring 60 retained by a threaded plug 61 having an escape port 62. A horizontal port 65, preferably disposed at a level between the O-ring 56 and the ball check valve 59, is coextensive with a port 66 which extends through an internal wall 67 of the valve body 46, and the two ports 65 and 66 together provide communication between the port 58 and a cylindrical bore 68.

The bore 68 has disposed therein, adjacent the blind end thereof, a cup-like piston 70. The piston 70 fits the bore 68 relatively loosely so as to be freely slidable therein and also to permit an appropriate flow of gas therepast, as will appear. A generally cylindrical valve cage 71 is removably disposed in the cylindrical bore 68, as clearly shown in Fig. 4, and is retained therein by means of a setscrew 72. The right-hand end of the valve cage 71, as shown in the drawing, is reduced in diameter so as to be freely received within the piston 70. As is also clear from Fig. 4, the cage 71 is bored clear through to provide successively from the left, a threaded portion 75, a reduced port portion 76, an enlarged recessed portion 77, and an intermediate bore 78. Additionally, a vertical port 79 cooperates with a port 80 through the wall of the cylindrical bore 68 and the port 19 in the top closing member 17 to provide communication between the recessed portion 77 and the interior of the shell 15. O-rings 81 and 82 disposed in annular grooves 83 and 84 on opposite sides of the recessed portion 77 provide seals to prevent leakage from the port 78 respectively to the outside of the valve body 46 or inwardly of the valve cage 71. An O-ring 85 disposed in a groove 86 similarly prevents leakage at the joint between the port 80 and the port 19. A needle valve 90 having a rounded end 91 shown in abutting relation with the piston 70 is slidably disposed in the bore 78 and has a conical end 92 adapted to close the port 76 for a purpose to appear. An O-ring 93 disposed in an annular groove 94 in the needle valve 90 adjacent the conical head 92 thereof provides a seal between the recessed portion 77 and the bore 78 when the needle valve 90 is in the position shown in Fig. 4. A horizontal bleed port 95 is provided in the wall of the cylindrical bore 68, and, in conjunction with the aforementioned loose fit of the piston 70, permits free movement of the latter in either direction. It is obvious that movement of the piston 70 to the left will cause the needle valve 90 to effect closure of the port 76, and, further, that such movement of the piston 70 does not unduly affect the functioning of the bleed port 95.

The mixing tank 14 comprises a shell 100 which may take the form of intersecting cylindrical sections such as the upright section 101 and the horizontal section 102 shown in Fig. 1. The shell 100, unlike the pump tank shell 15, may be constructed to withstand an appropriate operating pressure of only 60 pounds per square inch. The upper end of the upright cylindrical section 101 is closed by a top closing member 103 having a central threaded aperture 104 which receives a threaded nozzle 105, as gasket 106 being interposed between the top surface of the closing member 103 and a shouldered portion of the nozzle 105, as best shown in Fig. 5. The nozzle 105 has a threaded inlet 107 which receives a pipe 108 and communicates with a jet orifice 109 so as to introduce water received from the pipe 108 into the shell 100.

An absorbing tank 112, preferably of welded construction, is disposed in the upright cylindrical section 101 adjacent the top closing member 103 and is supported therein by threaded engagement of the nozzle 105 with an adapter 113, the latter being a part of the welded structure of the absorbing tank 112. The tank 112 further includes a cylindrical mixing cup 114 disposed concentrically within a container 115. The construction of the tank 112, as clearly shown in Fig. 5, is seen to provide, therefore, a mixing chamber 116 and an absorbent chamber 117. The absorbent chamber 117 is further defined by two annular plate members 118 and 119, each having a plurality of perforations 120. It will be noted from Fig. 5 that the member 119 forms a bottom for the container 115 and is disposed adjacent a closed bottom 121 of the mixing cup 114, while the member 118 is disposed at a level intermediate the upper and lower ends of the container 115 so as to provide a receiving space 122 in the container 115 thereabove. The wall of the mixing cup 114 is pierced by a plurality of holes 125 in circular spaced relation at a level slightly above the plate member 118, and also by a second plurality of smaller holes 126 in circular spaced relation at a level slightly below the adapter 113. It is obvious that the holes 125 and 126 communicate the mixing chamber 116 with the receiving space 122, the latter being also in free communication with the interior of the shell 100 by means of an open top 127 of the container 115. The absorbing chamber 117 is filled with a pervious mass 123, such as stainless steel wool or the like.

The horizontal section 102 of the mixing tank shell 100 contains a float assembly 130 mounted to an end closing member 131 of the section 102, as clearly shown in Figs. 1 and 6. The float assembly 130 includes a clevis bracket 132 appropriately secured to the end closing member 131, as by swaging a lug 133 of the bracket 132 into a countersunk hole 134 in the end closing member 131. A multi-fingered toggle member 135 is pivotally mounted in the bracket 132 by means of a pin 136. The toggle member 135 has coextensive fingers 137 and 138, the latter being engageable with a stop pin 139 disposed in the bracket 132 and the former having a clevis end 140 in which is secured a toggle pin 141. Additionally, the toggle member 135 has a depending finger 142 which is engageable with a valve stem 143, as will appear. A float arm 145 in the shape of an elongated clevis embraces the bracket 132 and is pivotally connected to the pin 136. The yoke end of the float arm 145 threadedly receives a float rod 146 attached to a spherical float 147, the rod 146 being bent so as to dispose the float 147 in appropriate relation to the float arm 145 to provide for a desired operation of the float assembly 130, as will appear. An energizing link assembly 150 is disposed between the clevis arms of the float arm 145 and comprises an elongated female member 151 having a notched end 152 which engages the toggle pin 141, as clearly shown in Fig. 6. The other end of the female member 151 has a bore 153 which slidably receives a shaft 154 of a male member 155, the unreceived end of the latter being formed to a conical point 156 which engages a conical depression 157 in the yoke end of the float arm 145. A compression spring 157 is disposed concentrically about the members 151 and 155 and acts between a collar 158 secured to the member 155 adjacent the conical point 156 and a collar 159 secured to the member 151 adjacent the notched end 152. It is obvious that the compression spring 157, thus disposed, tends continuously to extend the energizing link assembly 150 and is thus adapted to bias the toggle member 135 toward pivotal movement in either direction about the pin 136 depending upon the position of the float arm 145.

A shut-off valve 165 comprises a body 166 having an extended portion 167 threadedly received in and extending inwardly of the end closing member 131 of the horizontal section 102 of the shell 100. A gasket 168 seals this connection. An internal recessed portion 169 of the body 166 is axially threaded to receive an adapter 170 which in turn receives a pipe 171 secured therein by means of a pipe fitting 172. The recessed portion 169 also communicates with the pipe 108, one end of which is received in a wall of the recessed portion 169 and secured therein by means of a pipe fitting 173. The reduced portion 167 of the body 166 has a bore 175 which slidably receives the valve stem 143. A resilient valve member 176, of soft rubber or the like, is disposed in the recess 169 and, being appropriately secured to the valve stem 143, is adapted to engage a valve seat 177 formed at the inner end of the adapter 170. At the opposite limit of its travel, the valve member 176 engages a seat 178 formed adjacent the inner end of the bore 175.

The mixing tank 14 has both a gas connection and a water connection with the pump tank 12. As best shown in Fig. 1, the gas connection comprises a pipe 180 threadedly received in an upper portion of the end closing member 131 of the mixing tank shell 100 and connected to the outlet end of a differential pressure check valve 181 by means of a pipe fitting 182. The inlet end of the valve 181 is connected to a pipe 183 by means of a pipe fitting 184, and the other end of pipe 183 is received in a T 185 which also receives a pipe 186 engaging the threaded portion 75 of the cage 71 forming a part of the main control valve 45. The remaining opening of the T 185 receives a pipe 187 which connects the apparatus 10 to a pressurized source (not shown) of carbon dioxide gas.

The water connection between the mixing tank 14 and the pump tank 12 comprises a check valve 190 which is connected at its outlet end to the pipe 171 by means of a pipe fitting 191, and which is connected at its inlet end to a pipe 192 by means of a pipe fitting 193. The pipe 192 is connected to the aforementioned pipe 21 by means of a T 194 which also receives a pipe 195 connected to the outlet end of a check valve 196 by means of a pipe fitting 197. The inlet end of the check valve 196 is connected by means of a pipe fitting 198 to a pipe 199, the latter communicating with a source (not shown) of potable water under a nominal pressure of from 10 to 60 pounds per square inch, for example.

The differential pressure check valve 181, shown in detail in Fig. 3, comprises a body 205 having at its outlet end a threaded extension 206 for connection with the pipe fitting 182 and having an internally threaded inlet end which receives an adapter 207 having a threaded extension 208 for connection with the pipe fitting 184. A gasket or O-ring 209 seals the connection between the body 205 and the adapter 207. The body 205 is bored clear through to provide, from left to right in Fig. 3, a conduit 210, an enlarged piston chamber 211, and a further enlarged bypass chamber 212, the latter communicating with a coaxial bore 213 in the adapter 207. A piston 215, comprising a skirt section 216 and a head section 217, is slidably disposed in the piston chamber 211 with its head section 217 toward the adapter 207. The skirt section 216 encloses a spring chamber 218, in which is disposed a compression spring 219 acting between an internal shoulder 220 of the body 205 and the head section 217 of the piston 215. The head section 217 includes a valve insert 225, of soft rubber or the like, adapted to engage a seat portion 226 of the adapter 207, and it is obvious that the spring 219 continuously urges the piston 215 in a direction to close the conduit 213. A plurality of bypass ports 227 in the head section 217 of the piston 215 communicates the bypass chamber 212 with the spring chamber 218 and, hence, with the piston chamber 211 and the conduit 210, thereby providing a flow passage through the valve 181 when the valve insert 225 is disengaged from the seat 226.

The construction of the check valves 190 and 196 may be identical with the construction of the pressure differential check valve 181, above described, with the exception that the spring 219 in the valve 181 would either be removed entirely or replaced with a very light spring (not shown). On the other hand, the check valves 190 and 196 may take the form of lightly loaded ball check valves of well-known construction.

A carbonated water outlet pipe 230 is connected into the end closing member 131 of the mixing tank shell 100 adjacent the bottom thereof and leads to a dispensing valve or faucet (not shown) of well-known construction.

In the operation of the motorless carbonator 10, the pipe 187 is connected to an appropriate source of carbon dioxide gas. Such a souce is here assumed to be a conventional cylinder containing carbon dioxide gas under several hundred pounds of pressure and equipped with conventional means to deliver carbon dioxide gas at a constant pressure, of 100 pounds per square inch, for example. It is obvious that carbon dioxide gas under this assumed pressure of 100 pounds per square inch will be continuously available both in the conduit 213 of the pressure differential check valve 181 and in the port portion 76 of the main control valve 45. Now, if it is assumed that the spring 219 of the valve 181 is of sufficient strength to provide a closing force against the head section 217 of the piston 215 equivalent to 40 pounds per square inch of gas pressure, it is apparent that carbon dioxide gas will flow through the valve 181 and, hence, into the mixing tank 14; and, further, that such flow will continue until a pressure of 60 pounds per square inch is built up within the shell 100 of the mixing tank 14, whereupon the piston 215, under the combined influence of the spring 219 and the pressure in the piston chamber 211, will move toward the adapter 207 and cause the valve insert 225 to engage the seat 226 and thus shut off flow through the valve 181. Clearly, a drop in pressure within the mixing tank 14 below the assumed value of 60 pounds per square inch will again permit the piston 215 to be forced against the action of the spring 219, and there is thus established a means for maintaining a constant pressure of carbon dioxide gas within the mixing tank 14.

In the absence of opposing forces, as will appear, a gas pressure of 100 pounds per square inch in the port portion 76 of the main control valve 45 will move the conical end 92 of the needle valve 90 out of engagement with the port portion 76 and permit a flow of carbon dioxide gas through the recessed portion 77 and through the ports 79, 80 and 19 into the shell 15 of the pump tank 12. It is obvious that if the shell 15 initially contains no water, the float 25 will be at the bottom thereof resting upon the collar 31 of the valve rod 29, and the valve 39 will be withdrawn from the seat 41. Thus, as carbon dioxide gas enters the shell 15, it will be conducted through the aperture 18 and will flow through the perforations 38 in the valve guide 36 to enter the port 58 in the valve plug 42. The spring 60, acting against the ball check valve 59, is adapted to maintain the latter in closing engagement with the upper end of the port 58 at pressures of below 5 pounds per square inch, for example, but there is no restriction against flow of carbon dioxide gas through the port 65 and the port 66 into the bore 68 and against the head of the piston 70. Due to the relatively large piston area, as compared to the cross-sectional area of the port 76, it is apparent that gas pressure of less than 5 pounds per square inch is sufficient to cause movement of the piston 70 in a direction to effect closure of the port portion 76 by the conical head 92 of the needle valve 90. It is therefore obvious that, even during periods in the operation of the apparatus 10 when the escape valve 39 is withdrawn from the seat 41, a small pressure differential will be maintained between the interior of the shell 15 and the exterior thereof, thus eliminating any possibility of air or other matter leaking into the shell 15 and diluting or contaminating the contents thereof. Due to leakage of carbon dioxide gas past the piston 70 and out the port 95 under the conditions above stated, the needle valve 90 will cooperate with the port portion 76 to provide a metering action wherein the above-mentioned pressure differential will be maintained, it being further obvious, however, that the pressure within the shell 15 will remain below the assumed five pounds per square inch, or, in other words, at the low pressure required to maintain the piston 70 in a position properly to control the action of the needle valve 90 against the force of the gas pressure existing in the port portion 76.

With the pipe 199 connected to a source of water under a pressure of at least 10 pounds per square inch, it is obvious that, with a pressure of less than 5 pounds per square inch existing in the shell 15, water will be admitted thereinto through the pipe 21. This inflow of water will raise the pressure within the shell 15 to a value sufficient to displace the ball valve 59, thus still limiting the pressure within the shell to approximately 5 pounds per square inch and offering no hindrance to the inflow of water.

As water rises in the shell 15, the float 25 is carried upwardly along the valve rod 29 until the upper end extension 27 of the sleeve portion 26 abuts the lower end of the sleeve portion 35 of the valve guide 36, and it is apparent that, as the inflow of water continues, the escape valve 39 will be lifted upwardly until the surface 40 thereof engages the seat 41, thus preventing further escape of carbon dioxide gas from the interior of the shell 15. Due to the aforementioned loose fit of the piston 70, the pressure of carbon dioxide gas against the head thereof is quickly reduced to a point where the existing 100 pound pressure in the port portion 76 is effective to move both the needle valve 90 and the piston 70 in a direction away from the port portion 76, and the resulting inflow of carbon dioxide gas quickly establishes a pressure of 100 pounds per square inch in the shell 15. The existence of this pressure within the shell 15 is obviously sufficient to prevent further inflow of water into the shell 15, and the check valve 196 is effective to prevent the water being forced back through the pipe 195. Due to the pressure differential of approximately 100 pounds that now exists across the valve 39, the surface 40 will remain in engagement with the seat 41 even though the water level within the shell 15 is subsequently lowered so as to permit the float 25 to descend away from engagement with the sleeve portion 35 of the valve guide 36. When, however, the water level is lowered, as will hereinafter appear, to a point where the extension 28 again rests upon the collar 31, the valve rod 29 and its attachments will be moved downwardly, and the pressure in the shell 15 will again be reduced to 5 pounds per square inch or below as carbon dioxide gas is allowed to bleed past the ball check valve 59 and out through the escape port 62. As soon as this happens, it is apparent that water will again flow into the shell 15 and, except for the intermittent relatively short periods during which the shell 15 is refilled with water, the pump tank 12 will provide a source of water under a constant pressure of 100 pounds per square inch.

With the float assembly 130 in the low position depicted in Figs. 1 and 6, the energizing link assembly 150 is in a position to bias the toggle member 135 toward rotation in a clockwise direction, and the finger 138 is maintained in engagement with the stop pin 139. In this position, the depending finger 142 is withdrawn to a position such as to permit the valve member 176 to occupy a position away from the seat 177, and there is thus established a passage through the valve 165. Under these conditions, it is apparent that water at 100 pounds per square inch pressure will be conducted through the check valve 190 and the valve 165 and introduced into the nozzle 105. As is clear from Fig. 5, water entering the nozzle 105 is directed by means of the jet orifice 109 directly into the mixing chamber 116, and, due to the pressure differential of 40 pounds per square inch which exists between the water entering the nozzle 105 and the interior of the shell 100, the stream of water entering the mixing chamber is introduced at a relatively high velocity. Clearly, the carbon dioxide atmosphere existing within the shell 100 pervades not only the absorbing chamber 117 and the receiving space 122, but also the upper portion of the mixing chamber 116 above the outlet ports 125, and it is, therefore, apparent that considerable quantities of carbon dioxide gas will be entrained by the water jet and will be carried into the lower portion of the mixing chamber 116 where there will exist a violently turbulent action produced by the effect of both the water jet and the bubbling carbon dioxide. As the water which is thus partially carbonated within the mixing chamber 116 overflows through the holes 125, it flows through the perforations 120 of the upper annular plate 118 and enters the absorbing chamber 117. In flowing downwardly through the mass of stainless steel wool 128, the water is, of course, thoroughly agitated to present maximum surface to the pervading carbon dioxide atmosphere, and by the time it reaches the bottom of the absorbing chamber 117 it is thoroughly saturated with carbon dioxide gas. The now fully carbonated water drains through the perforations 120 in the lower annular plate 119 and drips down to collect in the lower portion of the horizontal section 102.

As the level of carbonated water which collects in the bottom of the horizontal section 102 rises, the ball float 147 is carried upwardly until the energizing assembly 150 is brought to a position just above coextension with the finger 137 of the toggle member 135, whereupon the latter is suddenly biased to rotate in a counterclockwise direction as viewed in Fig. 6, and the depending finger 142 is caused to strike with considerable force against the end of the valve stem 143. The valve member 176 is thus dislodged from the seat 178 and caused to engage the seat 177, thereby cutting off the flow of water through the valve 165. The valve member 176 is maintained against the 100 pounds per square inch force of the water at the inlet of the valve 165 due to the above-mentioned altered relationship of the toggle member 135 and the float arm 145 wherein the depending finger 142 is maintained against the end of the valve stem 143.

It is thus apparent that the apparatus 10 tends to attain a static condition wherein a predetermined quantity of carbonated water is made available for instant use. The carbonated water may be withdrawn for its intended use through the pipe 230, and it is apparent that when the surface in the horizontal section 102 has been lowered to a predetermined level, the energizing link assembly 150 and the toggle member 135 will undergo another over-center movement which will again effect withdrawal of the depending finger 142 away from the valve stem 143 and thus permit the water pressure in the inlet of the valve 165 to force the valve member 176 away from the seat 177, thereby effecting resumption of the carbonating process.

Tests have shown that the apparatus 10 works very well under the pressure conditions assumed in the above description of operation, and the fact that the required pressures are inherently available from a conventional supply of carbon dioxide gas attests to the portability of the apparatus without regard to the availability of power at the point of use. As to the water pressure required to fill the pump tank 12, the 10 pounds per square inch pressure above assumed may, of course, be attained by elevating the water supply to a height of approximately twenty-five feet above the pump tank 12. It is obvious, however, that water pressures above 10 pounds per square inch may be used, and it is thus feasible to connect the pipe 199 to a normal water supply pressure of from 40 to 60 pounds per square inch. Further, if a water pressure in the neighborhood of 100 pounds per square inch were available, the pump tank 12 would not be required and the water supply could be conducted directly to the inlet of the valve 165.

Inasmuch as the interior of both the pump tank 12 and the mixing tank 14 is continuously maintained at a substantial positive pressure, it is obvious that the entire apparatus 10 may be immersed in cold water or in an ice bath without danger of contamination of the contents thereof. By maintaining the complete apparatus 10 at a low temperature in this manner, the carbonation process will be made more efficient due to the effect of the consequent greater density of carbon dioxide gas in the mixing tank 14, and, in addition, the carbonated water will be maintained at the desired low temperature for consumption.

Clearly, there has been described a motorless carbonator which fulfills the objects and advantages sought therefor. It is to be understood that the foregoing description and the accompanying drawings have been given only by way of illustration and example. It is further to be understood that changes in the form of the elements, rearrangement of parts, and substitution of equivalent elements, which will be obvious to those skilled in the art, are contemplated as within the scope of the present invention which is limited only by the claims which follow.

What is claimed is:

1. A device for increasing the pressure of a liquid supply, comprising a container, first conduit means, including first valve means, connected with the container for admitting gas from a relatively high pressure source thereto, second conduit means, including second valve means, connected with the container for admitting liquid from a relatively intermediate pressure source thereto, third conduit means, including third valve means, connected with the container for emitting gas therefrom, fourth conduit means, including fourth valve means, connected with said third conduit means for venting gas therefrom, said fourth valve means including biasing means for precluding the venting of gas through said fourth conduit means when gas pressure in said third conduit means is below a relatively low predetermined pressure, float means connected with said third valve means for effecting alternate emission of gas from, and retention of gas in, the container in response to predetermined changes in a liquid level, piston means for operating said first valve means to regulate admission of gas into the container in response to predetermined changes in gas pressure in said third and fourth conduits intermediate said third and fourth valve means, and fifth conduit means including fifth valve means connected with the container for dispensing a liquid under relatively high pressure from the container, said fifth valve means being operable to preclude flow of the liquid back to the container.

2. A device for increasing the pressure of a liquid supply, comprising a shell for containing both a liquid and a gas, and control means for controlling the admission of gas to, and the emission of gas from, said shell, said control means including a main control valve connected to a supply of gas under pressure, first passage means interconnecting said supply of gas and the shell, first valve means for regulating a flow of gas through said first passage means, an escape port in said main control valve, second passage means interconnecting said shell and said escape port, second valve means for controlling a flow of gas through said second passage means, said second valve means being responsive to predetermined changes in a liquid level in said shell, a spring-loaded check valve disposed in said second passage means intermediate said second valve means and said escape port for limiting the pressure in the shell when said second valve means is in one position of response to said changes in liquid level, a piston chamber, third passage means interconnecting said piston chamber and said second passage means intermediate said second valve means and said check valve, piston means in said piston chamber responsive to pressure in said third passage means, said piston means being movable to influence the position of said first valve means, a bleed port for venting said piston chamber, a portion of said piston means being continuously interposed between said bleed port and said third passage means, and means continuously communicating said bleed port and said third passage means.

3. A main control valve for effecting different gas pressures in a container in accordance with predetermined changes in a liquid level therein, comprising first gas conduit means, including first valve means, connected with the container for admitting gas from a relatively high pressure source thereto, second gas conduit means, including second valve means, connected with the container for emitting gas therefrom, third gas conduit means, including third valve means, connected with said second conduit means for venting gas therefrom, said third valve means including biasing means for precluding the venting of gas through said third gas conduit means when gas pressure in said second conduit means is below a relatively low predetermined pressure, float means connected with said second valve means for effecting alternate emission of gas from, and retention of gas in, the container in response to predetermined changes in a liquid level, and piston means for operating said first valve means to regulate admission of gas into the container in response to predetermined changes is gas pressure in said second and third conduits intermediate said second and third valve means.

4. A main control valve for effecting different gas pressures in a container in accordance with predetermined changes in a liquid level therein, comprising first passage means interconnecting a supply of gas under pressure and the container, first valve means for regulating a flow of gas through said first passage means, an escape port, second passage means interconnecting the container and said escape port, second valve means for controlling a flow of gas through said second passage means, said second valve means being responsive to predetermined changes in a liquid level in the container, a spring-loaded check valve disposed in said second passage means intermediate said second valve means and said escape port for limiting the pressure in the container when said second valve means is in one position of response to said changes in liquid level, a piston chamber, third passage means interconnecting said piston chamber and said second passage means intermediate said second valve means and said check valve, piston means in said piston chamber responsive to pressure in said third passage means, said piston means being movable to influence the position of said first valve means, a bleed port for venting said piston chamber, a portion of said piston means being continuously interposed between said bleed port and said third passage means, and means continuously communicating said bleed port and said third passage means.

5. A main control valve for use with a container to effect discharge of a liquid at a high pressure therefrom, said valve including a housing having a first gas passageway connectible to the container and provided with a first valve for introducing a gas supply under high pressure thereinto, a second gas passageway in said housing connectible to the container and provided with a second valve for the removal of gas therefrom, means communicated with said second passageway for operating said first valve, said valve operating means including a piston chamber in said housing and a loosely fitted movable piston in said chamber, said piston being responsive to relatively low gas pressure from said second passageway and adapted to operate said first valve in opposition to relatively high pressure in the first passageway, and a venting passage communicated with the piston chamber for the escape of air moved past the sides of the piston upon retracting movement thereof.

6. A main control valve for use with a container to effect discharge of a liquid at a high pressure therefrom, said valve including a housing having a first gas passageway connectible to the container and provided with a first valve for introducing a gas supply under high pressure thereinto, a second gas passageway in said housing connectible to the container and provided with a second valve for the removal of gas therefrom, means communicated with said second passageway for operating said first valve, said valve operating means including a piston chamber in said housing and a loosely fitted movable piston in said chamber, said piston being responsive to relatively low gas pressure from said second passageway and adapted to operate said first valve in opposition to relatively high pressure in the first passageway, and a venting passage communicated with the piston chamber for the escape of air moved past the sides of the piston upon retracting movement thereof, and a relief valve communicated with said second passageway and biased at a relatively low pressure substantially below that of said gas supply pressure.

References Cited in the file of this patent

UNITED STATES PATENTS

| Number | Name | Date |
|---|---|---|
| 844,923 | Cridge | Feb. 19, 1907 |
| 1,126,662 | Stuhler | Jan. 26, 1915 |
| 1,209,355 | Sutherland | Dec. 19, 1916 |
| 1,322,324 | Mertens | Nov. 18, 1919 |
| 1,434,574 | Walter et al. | Nov. 7, 1922 |
| 1,454,971 | Love | May 15, 1923 |
| 1,516,187 | Hanson | Nov. 18, 1924 |
| 1,725,820 | Mumma | Aug. 27, 1929 |
| 1,764,433 | Carsten | June 17, 1930 |
| 1,791,013 | Rudolph | Feb. 13, 1931 |
| 1,945,725 | Bonney | Feb. 6, 1934 |
| 2,030,429 | Da Silva | Feb. 11, 1936 |
| 2,075,548 | Schaser | Mar. 30, 1937 |
| 2,195,449 | Delen | Apr. 2, 1940 |
| 2,206,447 | Berry | July 2, 1940 |
| 2,296,219 | Miller | Sept. 15, 1942 |
| 2,339,640 | Holinger | Jan. 18, 1944 |
| 2,414,607 | Phillips | Jan. 21, 1947 |
| 2,441,419 | Hudson | May 11, 1948 |
| 2,479,012 | Le Van | Aug. 16, 1949 |
| 2,604,310 | Brown | July 22, 1952 |
| 2,635,631 | Seefluth et al. | Apr. 21, 1953 |